United States Patent

[11] 3,562,577

[72] Inventor  Milo M. Kensrue
               Santa Ana, Calif.
[21] Appl. No. 744,006
[22] Filed     July 11, 1968
[45] Patented  Feb. 9, 1971
[73] Assignee  M.K. Products, Inc.
               a corporation of California

[54] ELECTRODE WIRE FEEDING MEANS FOR WELDING APPARATUS
9 Claims, 2 Drawing Figs.

[52] U.S. Cl. .................................................... 314/71,
                                                         219/130
[51] Int. Cl. ................................................. H05b 31/18
[50] Field of Search ............................................ 314/69, 71;
                                                     219/130, 136; 318/228

[56] References Cited
UNITED STATES PATENTS

| | | | |
|---|---|---|---|
| 2,095,281 | 10/1937 | Owens | 318/228X |
| 3,305,664 | 2/1967 | Kensrue | 219/130 |
| 3,344,305 | 9/1967 | Ogden, et al. | 314/69 |

Primary Examiner—Bernard A. Gilheany
Assistant Examiner—Roy N. Envall, Jr.
Attorney—Whann & McManigal ABSTRACT: Electrode wire-feeding means for electric arc-welding apparatus in which the electrode wire is conducted through a flexible conduit from a remote wire source to a manually operable welding gun at the point of use, first wire feed rollers at the gun being driven by an air motor controlled at the gun to regulate the rate of wire feed and pull the wire through the flexible conduit, second wire feed rollers being provided at the wire source driven by an electric motor, known in the industry as a "torque motor," for applying a propelling force to the wire, such force having a maximum limit as determined by the maximum stalled output torque of the motor, this motor having an energizing circuit controlled by a switch at the gun, and including selective switch controlled means operable at the remote station for changing the value of the maximum stalled output torque of the electric motor depending upon whether a relatively large or small sized wire is being used.

PATENTED FEB 9 1971

3,562,577

MILO M. KENSRUE
INVENTOR
WHANN & McMANIGAL
Attorneys for Applicants
BY 3,562,577

ELECTRODE WIRE FEEDING MEANS FOR WELDING APPARATUS

BACKGROUND OF THE INVENTION

The present invention relates generally to the electric welding art.

The present invention constitutes an improvement in welding apparatus such as that shown in my U.S. Pat. No. 3,305,664 which was granted on Feb. 21, 1967, and wherein an electrode welding wire is "pulled" to a welding gun at the work location and under the control of the welder, by means of a feed mechanism. The wire is supplied to the gun through a flexible conduit from a remote wire source.

The use of a single-pull type of feed presents well-known problems, and in order to improve this type of feed and provide increased flexibility of operation, it has heretofore been suggested to supplement the pull feed mechanism at the gun with a "push type" feed at the wire source which would be arranged to constantly apply a driving torque force. Supplemental feeds of this character were in the main designed to be actuated by power means such as a "torque motor" having a predetermined maximum driving torque. The usual practice has been to utilize a motor of this character in which the amount of torque was dictated by the maximum size of the wire to be used. Under such circumstances, satisfactory feed could be obtained with the larger wire sizes, but problems developed when the same torque or pushing force capabilities were applied to the smaller wire sizes.

For example, it has been found that in the case of relatively small diameters of aluminum welding wire, filler wire and the like of the order of .030 inches to .035 inches, a reduction of the wire feed rate at the gun tended to cause a kinking or bowing condition of the small wire within the flexible cable in such a way as to impede its forward movement, and in resumption of an increased feeding rate at the gun the kinked wire would produce undesirable feed regulations to appear.

On the other hand, if the driving torque force which was to be applied at the source was chosen so as to be proper for the smaller diameter wires, then there was invariably an insufficiency of driving force for the wires of the larger diameters under certain conditions, and the wire friction could under such circumstances provide undesirable and erratic feeding action.

It is therefore proposed in the present invention to provide versatile power means wherein by a simple procedure, for example, by simply changing a control switch from one position to another, change the torque output characteristics of the feed mechanism at the source to either a "high" torque or "low" torque mechanism, depending upon whether it is desired to feed a heavy or light welding wire.

SUMMARY OF THE INVENTION

The present invention relates generally to electric arc-welding apparatus, and is more particularly concerned with improvements in the mechanism for feeding of an electrode wire from a remote source through a flexible conduit to the point of use.

It is one object of the present invention to provide in welding apparatus, improved electrode wire-feeding means in which the wire is pulled to a welding gun through a flexible casing or a conduit from a remote wire source, and at the same time is pushed at the wire source end of the conduit by a continuously applied predetermined force.

A further object is to provide wire-feeding means according to the foregoing object, wherein the applied predetermined force is generated by power means having a selectable maximum stalled driving torque output.

Another object resides in the provision of a wire feed mechanism for a welding gun which includes a wire-moving mechanism at the wire source for pushing the wire through a flexible conduit to the gun, the mechanism being power driven by an electric "torque motor" having predetermined maximum torque output selectable to operate at a relative high torque and at a relatively low torque.

Still another object is to provide in a wire-feeding mechanism, a unique drive including a torque motor of the split field type having a capacitor in circuit with one of its field portions operable to provide a high-torque output for feeding relatively large wire, and a resistor connectable in circuit with the capacitor to provide a low-torque output for feeding relatively small wire.

It is also an object to provide a wire-feeding mechanism for welding apparatus, in which a controlled variable wire feed at the welding gun is operated in combination with a feed mechanism at the wire source, the latter having selectable maximum stalled output torque characteristics depending upon whether a heavy wire or fine wire is being used, and which may be changed to the low-torque delivery in order to prevent kinking of the small wire during feeding operations.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT OF THE INVENTION

Figure 1:
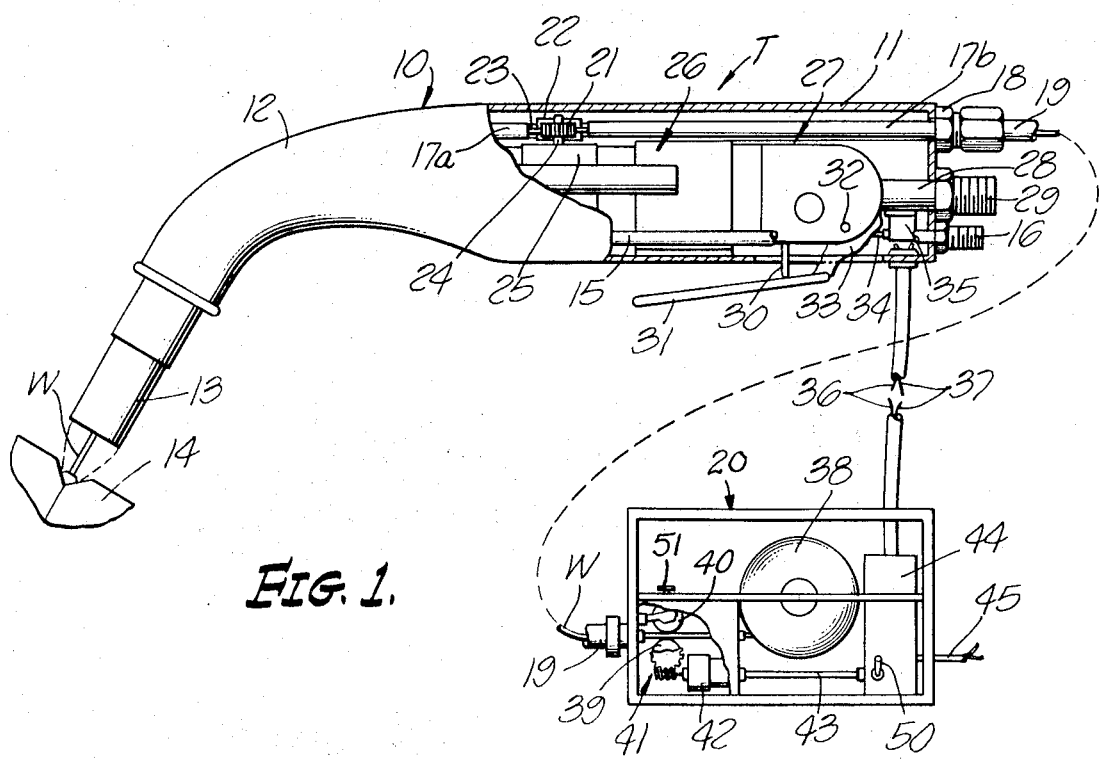
FIG. 1 is a side elevational view of a welding gun having a pull-type wire-feeding mechanism, the gun being associated with a source push-type feeding unit as diagrammatically illustrated, and embodying the features of the present invention.

For illustrative purposes, there is shown in FIG. 1 a welding gun or torch T having a construction corresponding generally to the torch shown in my issued U.S. Pat. No. 3,305,664. In the present instance, details are shown with respect to only those parts which are concerned directly with the present invention.

In general, the torch comprises an elongate housing 10 of generally tubular construction, this housing at one end having a straight body portion 11 which forms a handgrip and is continued into a neck extension 12 at the opposite end having a curved axis. The outermost end of this neck is connected with a welding nozzle 13 through which an electrode wire W is fed into the weld which is being made on a workpiece 14. A suitable inert gas is supplied to the weld through a conduit 15 having one end appropriately connected with the nozzle 13 and its other end connected with a suitable connection fitting 16 by means of which connection may be made to a suitable source of supply through a conventional conduit (not shown).

The electrode wire W is fed to the weld through a wire guiding tube composed of cooperative sections 17a and 17b, having their innermost ends in axially aligned spaced end-to-end relation. The first section 17a connects with the nozzle 13, while the other section 17b terminates in a connection fitting 18 adapted for connection with one end of a flexible conduit or casing 19 leading to a remotely located wire-feeding unit 20 at the wire source of supply.

At the torch, the electrode welding wire W is led into the tube section 17b from the connection fitting 18 and thence through the section 17a. This wire is fed by means of cooperatively associated rollers which consist of a drive roller 21 and an idler roller 22 which are positioned in a gap or space 23 between the ends of the tube sections 17a and 17b, the welding wire W passing between these rollers. The rollers may have serrated peripheries so as to better engage the wire, the drive roller 21 being power driven through a connecting shaft 24. The idler roller 22 may be provided with suitable adjusting means (not shown) by which its pressure engagement with the wire may be varied.

The shaft 24 of the power driven roller is connected with a speed reduction device 25 which is connected at one end of a driving motor housing 26. This motor is of a type which is arranged for operation by fluid under pressure, such as air or other gas, and has an axis of rotation which is positioned in parallel relation to the longitudinal axis of the handgrip portion 11 of the housing. This motor has an end cap 27 to which there is secured an inlet conduit 28 for the motor-actuating fluid, the outermost end of this conduit terminating in a connection fitting 29 which serves both as a connector for supplying fluid to the motor as well as electric power to the welding wire electrode as it passes through the torch en route to the welding nozzle 13. The connection fitting 29 is connectable with a conduit (not shown) which performs the dual purpose of conducting the fluid such as air to the torch for the operation of the wire-feeding means therein, and also includes a conducting shield of copper, aluminum or other suitable metal which forms an electrical conducting path for current supplied to the electrode wire.

The innermost end of the inlet conduit 28 communicates with a valve control structure (not shown) contained within the end cap 27 of the motor, this valve structure including a projecting control stem 30 having its outer end engaged with a valve control lever 31 which extends alongside the exterior of the handgrip portion where it is easily engaged by the hand of the welder during the operation of the torch, and can be easily manipulated to control the speed of the feed mechanism motor. This lever is hinged at its inner end on a pivot 32, and is adjacently provided with a cam portion 33, the camming edge of which is associated with an actuating member 34 of an associated microswitch 35 having contacts arranged to close an electrical circuit containing the conductors 36 and 37. The closing of this circuit is arranged to take place immediately prior to the actuation of the valve control structure to its open position by operation of the valve control lever 31. The contacts of the microswitch 35 remain closed during regulatory speed changes of the feed mechanism on the torch by means of the control lever 31.

At the wire-feeding unit 20, the wire is taken from a rotatably mounted reel 38 and passes between a drive roller 39 and an idler roller 40 which is arranged to be adjusted by means of a rotatable knob 51 in conventional manner to vary the engagement pressure of the rollers upon the wire. From the feeding rollers, the wire enters the flexible conduit through which it is fed to the welding gun T.

The drive roller 39 is driven through a worm gear and worm transmission 41 by means of an electric motor 42 having energizing conductors (not shown) which are carried through a conduit or a cable 43 from a control box 44 to which lead the conductors 36 and 37 from the microswitch 35, as well as a connected suitable power supply 45.

Figure 2:
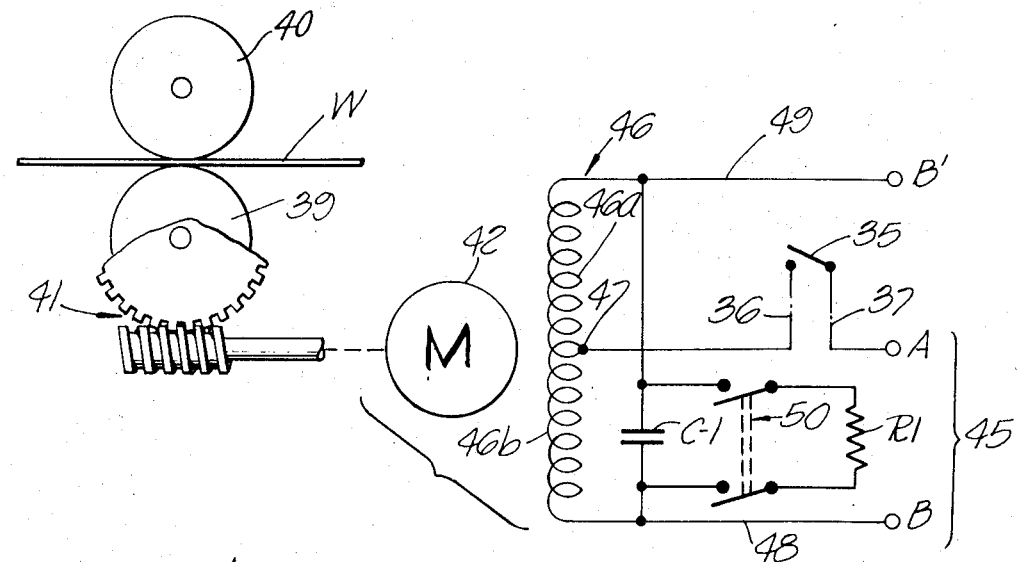
FIG. 2 is an enlarged fragmentary detail view of the feeding mechanism, including a schematic representation of the motor control torque changing circuitry.

The motor 42 is of the type commonly referred to as a "-torque motor" which is designed to provide a predetermined maximum torque under stall conditions. The motor has a split main field 46 having a two-part winding 46a and 46b. As shown in FIG. 2, the power supply 45 is connected to terminals A and B. The terminal A connects through switch 35 with a common midpoint 47 of the windings 46a and 46b, while terminal B is connected through a conductor 48 with the other end of winding 46b. A terminal B' connects through a conductor 49 with the other end of winding 46a. For reversed operation of the motor, the power supply 45 would be connected with terminals A and B'.

In order to provide a phase displacement in one of the windings, a capacitor C-1 is connected between conductors 48 and 49. This capacitor also determines the torque rating of the motor.

According to the present invention, it is proposed to change the motor torque from a high maximum stall value when used with relatively large welding wire to a decreased maximum stall value when used with relatively smaller welding wire. For this purpose, the change output torque characteristics is accomplished by providing a resistor R-1 which is connectable across the capacitor C-1 by means of a switch 50. In open position of the contacts of switch 50, the motor will deliver high-torque characteristics, while in the closed position of switch 50 the resistor R-1 will be connected in circuit with the capacitor C-1 and connect the motor for the low-torque characteristic.

As indicative of specific design characteristics of the present invention, it may be stated that the driving motor of the feed roller 21 of the welding gun is arranged to advance the wire at a speed of approximately 900 inches per minute, and the control by means of lever 31 to vary the speed from 50 inches to 600 inches per minute. Similarly the speed of wire advance at the wire-feeding unit 20 is designed for comparable continuous feed.

As an example of the type of driving motor which has been utilized at the wire-feeding unit 20, the following is indicated:
Manufacturer: BODINE
Voltage: 115 AC; Single phase; 60 Cycle; 14 Watts
R.P.M. –1200
Torque 1.9 inch ounces
Capacitor C-1, 1.4 mfd.
Type KC1–26–A1

The speed reduction through the worm gear and worm transmission is 5 to 1.

With the capacitor C-1 in the circuit, a torque of approximately 20 inch ounces will be delivered from the transmission 41 for use in driving the larger wires, while with a resistor R-1 having a value of substantially 3,000 Ohms connected across the capacitor C-1, a torque of approximately 12 inch ounces will be delivered for use in feeding the smaller size wires of diameters of the order of .030 to .035 inches.

It will be observed that through the operation of the microswitch 35, the feeding mechanism at the torch and the feeding mechanism at the unit 20 will be substantially simultaneously controlled and synchronized.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned except to the extent indicated in the appended claims.

I claim:

1. Electrode wire feeding means for welding apparatus, comprising:
   a. a source of electrode wire remote from a welding device with which said wire is to be used;
   b. means for feeding said electrode wire from said source to a point of use at said device including primary wire-feeding means and control at said device, and wire-feeding elements at the wire source for withdrawing the wire from said source and propelling it longitudinally to said primary wire-feeding means;
   c. power means for actuating said elements and constantly delivering a driving torque thereto during movement and nonmovement of said electrode wire, said power means having a predetermined maximum stalled output torque limit less than the column strength of said electrode wire; and
   d. means for selectively presetting the maximum output torque limit of said power means at different values depending upon the size of said wire, said values being less than the column strength of the wire, whereby under maximum stall torque conditions wire kinking will be prevented between said elements and the primary wire-feeding means.

2. Electrode wire feeding means according to claim 1, wherein the power means comprises an electric torque motor.

3. Electrode wire-feeding means according to claim 2, wherein the motor is of the split main field type having one field portion containing a capacitor in circuit therewith operative to provide a predetermined maximum stall torque output;

and including means for varying the effect of said capacitor to provide a maximum stall torque output of a different value.

5. Electrode wire feeding means according to claim 2, wherein the motor has a two part main field winding, one of said parts having a capacitor in series therewith, whereby to provide a phase shift between the fields produced by the winding parts, and to normally deliver a maximum stalled driving torque; and including means for connecting a resistor in parallel with said capacitor to decrease the maximum stalled driving torque.

6. Electrode wire-feeding means for welding apparatus, comprising:
   a. a source of electrode wire remote from a welding device with which said wire is to be used;
   b. means for feeding said electrode wire from said source to a point of use at said device including feed rollers at the wire source for withdrawing the wire from said source and propelling it longitudinally towards said point of use; and
   c. electric motor power means for driving said rollers selective to deliver different values of maximum stall driving torque forces in accordance with different sizes of the wire, said driving torque forces being less than the column strength of the wire to prevent kinking of the wire between said feed rollers and said point of use.

7. Electrode wire-feeding means according to claim 6, wherein the feeding means further includes air motor driven feed rollers at said device for pulling said wire.

8. Electrode wire-feeding means according to claim 7, including manually operable control means at said device for simultaneously controlling said air motor and said electric motor.

9. Electrode wire-feeding means according to claim 7, wherein the electric motor power means comprises a torque motor, and including means selective to change the motor from a high maximum stall torque delivery limit to a low maximum stall torque delivery limit and vice versa.

UNITED STATES PATENT OFFICE
CERTIFICATE OF CORRECTION

Patent No. 3,562,577                Dated   February 9, 1971

Inventor(s)  Milo M. Kensrue

It is certified that error appears in the above-identified patent and that said Letters Patent are hereby corrected as shown below:

Column 3, line 74, the word --in-- should appear before "out

Column 5, following line 2, insert allowed Claim 4, as follo

--4. Electrode wire feeding means according to claim 3, wherein said means for varying the effect of said capacitor comprises a resistor connected in a parallel circu therewith.--

Signed and sealed this 13th day of July 1971.

(SEAL)
Attest:

EDWARD M. FLETCHER, JR.  
Attesting Officer

WILLIAM E. SCHUYLER, J:  
Commissioner of Patent: